April 18, 1972  E. W. GRONEMEYER ET AL  3,657,407
METHOD AND APPARATUS FOR MAKING VALVE UNITS
Filed Feb. 10, 1970  3 Sheet-Sheet 3

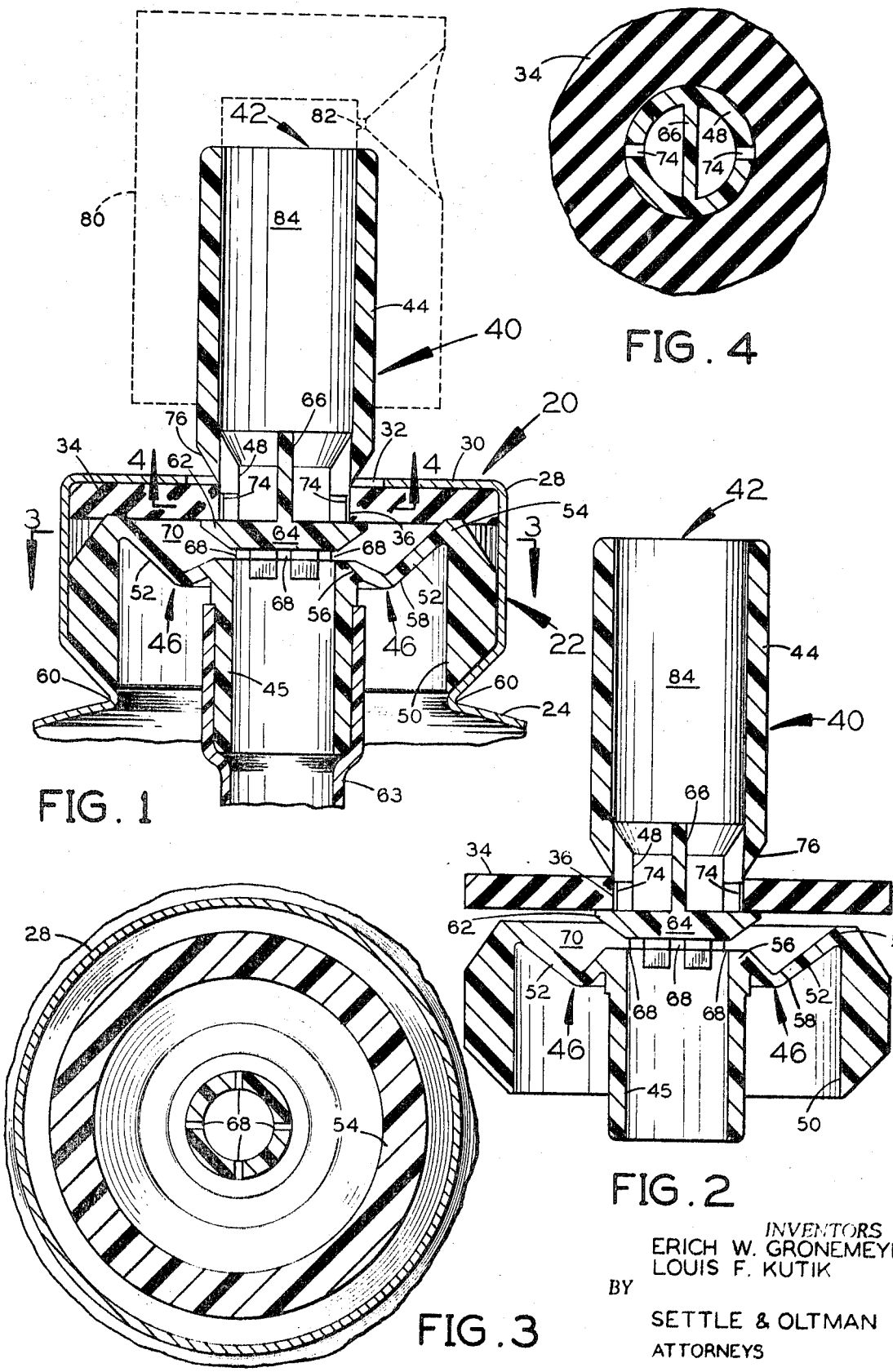

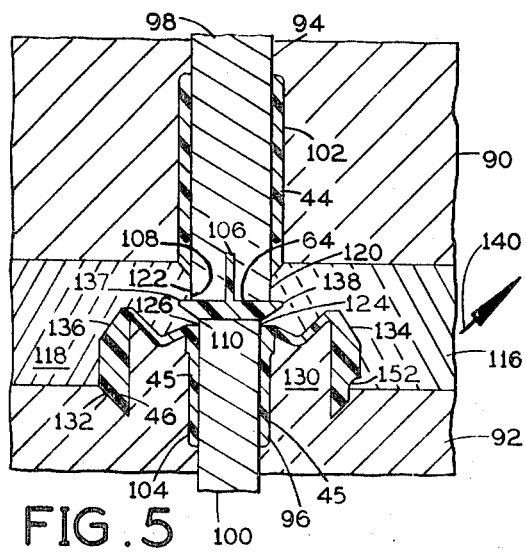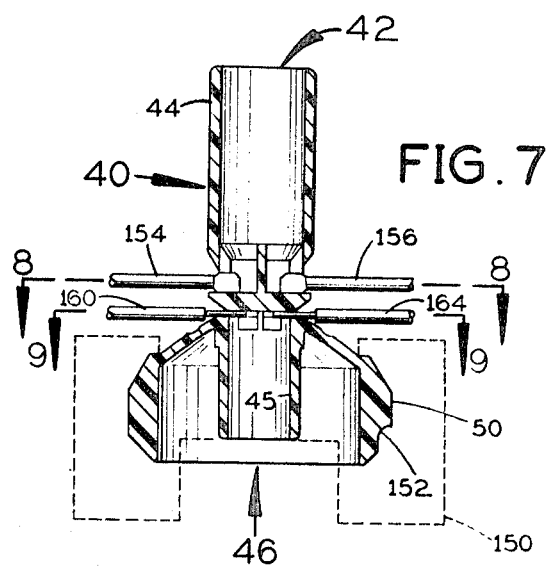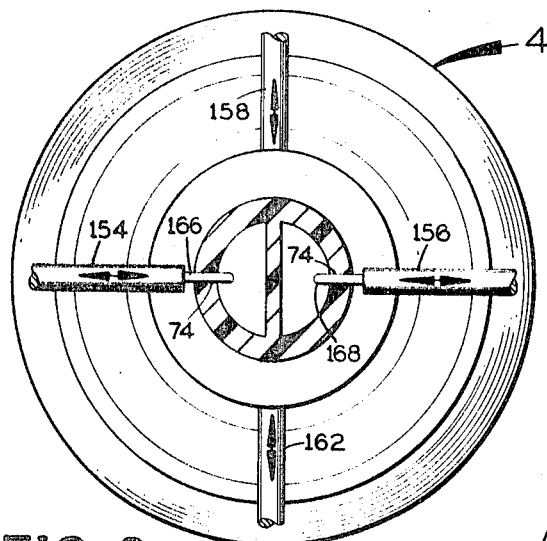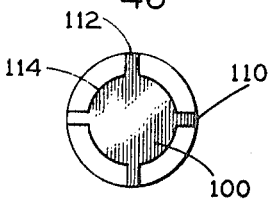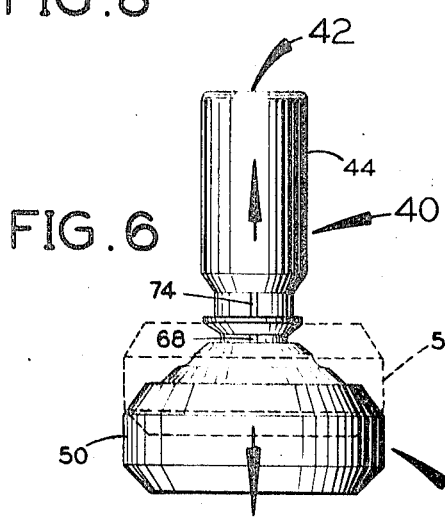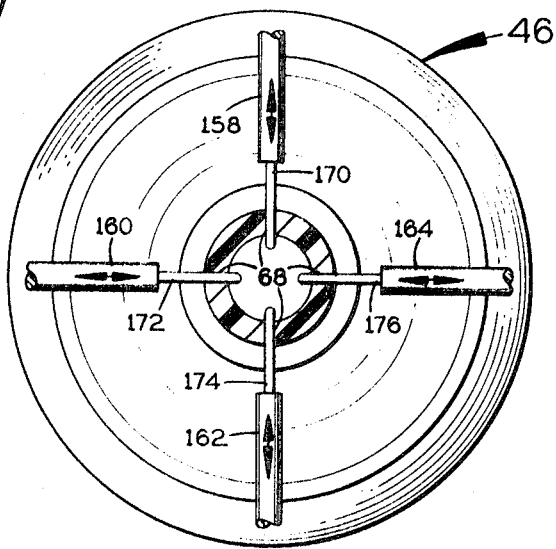

INVENTORS
ERICH W. GRONEMEYER
LOUIS F. KUTIK
BY
SETTLE & OLTMAN
ATTORNEYS

United States Patent Office 3,657,407
Patented Apr. 18, 1972

3,657,407
METHOD AND APPARATUS FOR MAKING VALVE UNITS
Erich W. Gronemeyer, 2100 S. Ocean Lane 33316, and Louis F. Kutik, 8720 SW. 23rd Place 33305, both of Fort Lauderdale, Fla.
Filed Feb. 10, 1970, Ser. No. 10,224
Int. Cl. B29c 17/12
U.S. Cl. 264—156                    6 Claims

ABSTRACT OF THE DISCLOSURE

Method of and apparatus for making valve units, particularly for aerosol valves, wherein a valve unit is molded from plastic with a hollow stem, a radial flange or diaphragm projecting from the stem, and openings or recesses for openings in the stem at one side of the flange. The method preferably includes a step of piercing the stem at the openings or recesses for inspection and to penetrate any plastic flash or film which may cover or partially cover the openings. The apparatus includes mold parts particularly adapted to mold the stem, flange and openings on a reliable, high yield basis.

RELATED APPLICATIONS

This application is related in particular to a copending application Ser. No. 733,701, now Pat. No. 3,521,859, filed on May 31, 1968 by Erich W. Gronemeyer, one of the present inventors, and also relates to application Ser. No. 831,374 filed on June 9, 1969, and application Ser. No. 831,417, now Pat. No. 3,596,811, filed on June 9, 1969 both by the present inventors.

BACKGROUND OF THE INVENTION

The valves described and claimed in the copending applications identified above include a plastic valve unit having a hollow stem with a flange or diaphragm projecting from a medial portion of the stem, and openings in the stem at one side of the flange. The interior of the stem is blocked by a blocking portion adjacent the openings. The valve and valve unit have a number of important features, and one of these is a particular dimensional design of a medial portion of the stem to allow mold forming of the openings. Although the valve unit can be molded by conventional techniques which are not a part of the present invention, it is believed to be desirable to provide method and apparatus for production of the valve unit on a reliable, high yield basis in order to facilitate commercial production of the valve unit and valve.

One of the practical problems encountered in production of the valve unit is that mold flash may form over the openings in the valve stem during molding, and this mold flash can interfere with proper passage of fluid through the valve in the ultimate operation of the valve. The present invention provides for piercing of the openings for inspection purposes and to penetrate any mold flash which may be present in order to assure that the openings are clear. Similarly, the present invention allows for intentional formation of a thin film of plastic over the openings in the valve stem with subsequent piercing of this film to provide openings of the desired size. The present invention also provides for molding of the valve unit with the flange in a different position in one embodiment as compared to another, distortion of the flange being permissible either for inspection or for final assembly of the valve unit into a complete working valve assembly.

OBJECTS OF THE INVENTION

It is an object of the present invention to mold valve units from plastic by a novel method which provides for high production molding with relatively high yields of acceptable valve units.

Another object of the invention is to mold valve units having a hollow stem and a flange projecting from the stem with openings or recesses for openings at one side of the flange by a method which includes piercing the stem at the opening or recesses for inspection and to penetrate plastic flash or film covering or partially covering the openings.

A further object of the invention is to provide a method and apparatus for molding and inspection of plastic valve units which allows relative distortion of the valve stem and flange of the valve unit during the fabrication of the valve unit and valve.

Another object of the invention is to provide mold apparatus which is especially suitable for high production molding of a valve unit having a hollow stem with a radial flange and openings in the stem adjacent the flange.

A further object of the invention is to provide for molding of a valve unit having a stem with a radial flange, the flange being in a different position in one embodiment as compared to another.

Other objects of this invention will appear from the following description and appended claims, reference being had to the accompanying drawings forming a part of this specification wherein like reference characters designate corresponding parts in the several views.

On the drawings:

FIG. 1 is an enlarged vertical sectional view of a valve for dispensing pressurized contents of a container, the valve being applied to the top of a container and shown in a closed position;

FIG. 2 is a vertical sectional view of a valve unit and a sealing washer included in the valve of FIG. 1, the valve unit being shown in an unbiased condition prior to assembly;

FIG. 3 is a horizontal sectional view taken along line 3—3 of FIG. 1 and looking in the direction of the arrows;

FIG. 4 is a horizontal sectional view taken along line 4—4 of FIG. 1 and looking in the direction of the arrows;

FIG. 5 is a fragmentary sectional view of molding apparatus for molding the valve unit of FIGS. 1 through 4, and also illustrates a molding step;

FIG. 6 is an elevational view of a valve unit after molding thereof, the valve stem and flange of the valve unit being shown in changed positions to illustrate relative distortion of the stem and flange to facilitate inspection;

FIG. 7 is a sectional view of the valve unit as distorted in the manner shown in FIG. 6 and illustrating a step of piercing the valve stem at openings thereof to penetrate flash or film at the openings;

FIG. 8 is a horizontal sectional view taken along line 8—8 of FIG. 7 looking in the direction of the arrows;

FIG. 9 is a horizontal sectional view taken along line 9—9 of FIG. 7 looking in the direction of the arrows;

FIG. 10 is a view of one end of a pin included in the molding apparatus of FIG. 5;

Figure 11:
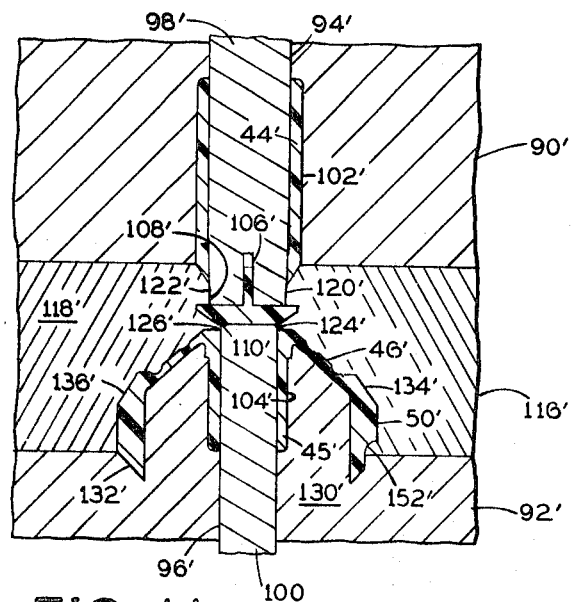
FIG. 11 is a vertical sectional view of molding apparatus for molding a valve unit with a flange in a different position as compared to FIG. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGS. 1 through 4, a valve 20 is shown which is of the type described and claimed in application Ser. No. 733,701 referred to previously. This valve will be described briefly for the purpose of providing background information pertinent to the description of the present invention which will follow.

The valve 20 is applied to the top of a container which has a metal stamping 22 connected by portion 24 to a rim of the container, the container itself being omitted from the drawings since it is not necessary to an understanding of the valve structure. Stamping 22 includes an annular part 28 with a horizontally directed flange 30 having a central opening 32 therein.

The valve 20 includes a yieldable sealing washer 34 which fits inside the annular portion 28 of stamping 22 and butts against flange 30. Washer 34 has a central opening at 36 in alignment with and slightly smaller than the opening 32 in flange 30. Washer 34 is made of a yieldable resilient material such as plastic or rubber, rubber being shown in the drawings.

Valve 20 also includes a one-piece valve unit generally designated 40. Valve unit 40 includes a tubular valve stem 42 having an outer portion 44 outside the container, an inner portion 45 inside the container and an intermediate portion 48 extending through the sealing washer 34 and flange 30.

In addition to valve stem 42, valve unit 40 includes a flange or diaphragm generally designated 46 which has two portions; namely, a generally cylindrical ring 50 encircling valve stem 42 and a flexible spring-like membrane 52 extending transversely of valve stem 42 and interconnecting ring 50 and inner portion 46 of the valve stem. The outer diameter of membrane 52 at 54 is molded integrally with the top of ring 50, and the inner diameter of membrane 52 at 56 is molded integrally with inner portion 46 of valve stem 42. The membrane 52 has a bend at 58 which facilitates flexing of the membrane so that the valve stem 42 can be depressed easily.

The ring 50 fits inside the annular portion 28 of stamping 22. Stamping 22 is crimped at 60 so as to urge ring 50 upwardly so that the top 54 of ring 50 sealingly contacts the washer 34. Since washer 34 is yieldable, top edge 54 of ring 50 pushes into washer 34 slightly and thus forms a good seal.

A stem seal 62 projects radially outwardly from valve stem 42, and when the valve is assembled with the container as in FIG. 1, stem seal 62 is urged by a spring action of membrane 58 and also by the pressure in the container against sealing washer 34 to form a seal. A dip tube 63 fits on the outside of inner portion 46 of the valve stem 42, and this dip tube extends down into the container to allow pressurized contents of the container to pass upwardly into the valve. The dip tube may be longer than the container so that it bends within the container and exerts a further force on the valve stem 42 to further aid in biasing the stem seal against the washer 34, if desired.

Stem seal projection 62 may be thin and flexible so as to conform to any irregularity in the sealing washer 34, and thus provide a tight seal.

The interior of valve stem 42 is blocked by a blocking portion 64 molded integrally with the side wall of the valve stem. Blocking portion 64 is preferably located in alignment with stem seal 62 just above the inner diameter 56 of membrane 52. A baffle 66 extends transversely across the interior wall of the valve stem.

A first set of openings 68 are formed through the wall of valve stem 42 between blocking portion 64 and membrane 52. There must be at least one such opening 68, and in the illustrated embodiment there are four openings 68. These openings lead from the interior of inner valve stem portion 45 to a compartment 70 formed between the membrane 52 and sealing washer 34. Openings 68 communicate with the interior of the container through the dip tube 63.

A second set of openings 74 are formed through the wall of the valve stem 42 at the intermediate portions 48 thereof. The second openings 74 are most clearly visible in FIG. 4. The second openings 74 are normally blocked by the inner edge of the sealing washer 34. The opening 36 through sealing washer 34 is smaller than the outside diameter of intermediate portion 48 of valve stem 42 so the sealing washer 34 grips intermediate portion 48 and blocks the openings 74. Also, the stem seal 62 prevents communication between openings 74 and openings 68. The outside diameter of intermediate valve stem portion 48 is smaller than the outside diameter of portion 44, there is a tapering surface 76, which prevents upward displacement of sealing washer 34, downward displacement of the washer, relative to the intermediate portion 48, being prevented by stem seal 62.

The outside diameter of intermediate portion 48 at openings 68 is substantially the same as the inside diameter of inner valve stem portion 45. Similarly, the outside diameter of intermediate portion 48 at openings 74 is substantially the same as the inside diameter of outer portion 44 of valve stem 42. This dimensional relationship facilitates mold-forming of the openings, as will be described.

FIG. 2 shows the valve unit 40 assembled with the sealing washer 34 before this asesmbly is placed in the metal stamping 22. This shows that before the ring 50 is crimped into the annular part 28, the top of ring 50 at 54 is spaced below sealing washer 34. Then when ring 50 is crimped into annular part 28 of metal stamping 22, ring 50 forms the seal referred to previously, and membrane 58 is flexed so that it urges the valve stem 42 and also sealing washer 34 upwardly.

A cap 80 having a very small discharge aperture 82 extending through it is placed on the top of valve stem 42 to form a second compartment 84 within the valve stem. Of course, aperture 82 could be in the valve stem 42 rather than a cap, but this is not preferred.

In order to discharge the contents of the container, cap 80 and valve stem 42 are depressed, and membrane 52 flexes downwardly to allow depression of the valve stem. The valve stem bends sealing washer 34 downwardly so that the inner edge of the sealing washer at 36 pulls away from the openings at 74 and also away from the stem seal 62 to uncover the openings 74. This action of the valve stem is described and illustrated in copending application Ser. No. 733,701 referred to previously, and the description will not be repeated in detail herein. Up to this point, the description of structure has been substantially the same as that in copending application 733,701 in order to provide sufficient background for the description of the present invention as follows.

FIG. 5 shows molding apparatus and a molding step which may be used in making the valve unit 40 of FIG. 1. The molding apparatus includes an upper platen 90 and a lower platen 92, these platens respectively having bores 94 and 96 in them. An upper pin 98 fits in the bore 94, and a lower pin 100 fits in the bore 96. The bores 94 and 96 are enlarged respectively at 102 and 104 to form tubular portions of a cavity in which the upper stem portion 44 and the lower stem portion 46 of the valve unit are molded. The pin 98 has a groove 106 at its lower end defining a portion of the cavity in which the baffle 66 is molded. The inner ends of the pins 98 and 100 are spaced apart slightly to define a portion of the cavity in which the blocking member 64 of the valve unit is molded. Pin 98 is fluted at its lower end 108, and pin 100 is fluted at 110. An example of this fluting is shown at 110 in FIG. 10. It may be seen that the pin 100 at its upper end 110 has projections 112 separated by recesses 114 to form the fluting. The upper pin 98 is fluted in the same manner at 108, except that only two projections are provided instead of four projections.

Between the platens 90 and 92 there is a split ring structure formed by two ring halves 116 and 118. The inner surface of these ring halves at 120 and 122 contact the projections on the lower end of pin 98, and where these surfaces touch each other, the openings 74 are molded. Similarly, the surfaces of the ring halves at 124 and 126 touch the projections 112 at the upper end of pin 100, and where these surfaces touch each other the openings 68 are molded. It is possible that a certain amount of flash would in some instances form at surfaces 120, 122, 124 and 126, and this flash is pierced in a later step in the processing as will be described. Similarly, it would be possible to leave very, very thin gaps at surfaces 120, 122, 124 and 126 between the surfaces of the adjoining projections of the pins 98 and 100 so as to leave the recesses for openings covered by a very thin film of plastic. These plastic films would then be pierced in a later step in the processing to form holes of predetermined size, as will be explained.

Platen 92 has an outwardly extending ring shaped projection 130 and a surrounding recess 132. Ring halves 116 and 118 are recessed at 134 and 136. The surfaces of projection 130, recess 132 and recess 134 define the radial flange or diaphragm 46 of the valve unit. Recesses 137 and 138 in the ring halves 116 and 118 define the cavity portion for the stem seal 62. A suitable gate is provided leading into the mold cavity through which thermoplastic material may be injected into the cavity in the usual manner to mold the valve unit. All portions of the cavity communicate with each other as shown in FIG. 5.

After the thermoplastic material has solidified in the cavity, the mold is opened to allow the valve unit to be removed from it. The platens 90 and 92 are separated vertically, and the ring halves 116 and 118 are moved upwardly and to the side at an angle as indicated by the arrow 140. This allows the portions 124 and 126 of the ring halves to slide or snap out from the recess between the stem sealing portion and the flange portion of the valve unit.

FIG. 6 shows the valve unit 40 after it has been removed from the mold, and illustrates a step of relatively distorting the valve stem 42 and flange 46. The ring 50 of the flange 46 is shown in dashed lines in FIG. 6 in its normal upper position where it partially blocks access to the openings in the valve stem. In order to gain access to these openings 68 for inspection purposes, the ring 50 is moved downward or the valve stem 42 is moved upward relative to ring 50 to extend the whole flange 46 downward away from the openings 68 as shown in solid lines in FIG. 6. This makes it possible for a piercing means to enter the openings 68 and also the opening 74 from the side of the valve unit in the manner shown in FIGS. 7, 8 and 9.

In FIG. 7, the valve unit 40 is in the distorted position shown in FIG. 6, and is held in a locating fixture 150 shown in dashed lines. The fixture 150 may enter a locating notch 152 molded in the ring 50 to fix the position of the fixture 150 relative to the ring 50. However, the whole fixture 150 may be rotatable to a stop so as to position the openings 68 and 74 in alignment with piercing tools. There is an upper set of piercing tools 154 and 156, and a lower set of piercing tools 158, 160, 162 and 164. The upper piercing tools 154 and 156 are most clearly visible in FIG. 8, and the lower piercing tools 158, 160, 162 and 164 are most clearly visible in FIG.9. When the piercing tools are moved inwardly, the upper tools 154 and 156 pierce the valve stem 42 at the openings or recesses for openings 74 in the maner shown in FIG. 8 to penetrate any flash or film which may cover or partically cover these openings. The small pins 166 and 168 at the inner ends of the piercing tools will produce openings of a predetermined size if there is a film covering the openings. Similarly, the tools 158, 160, 162 and 164 when moved inwardly will pierce the valve stem 42 at the openings 68, and the small pins 170, 172, 174 and 176 at the inner ends of these tools will penetrate any flash or film covering or partially covering the openings or recesses for openings 68. The pins will produce openings of predetermined size.

Thus, the invention provides a step of piercing the valve stem at the openings for inspection purposes and to penetrate any flash or film which may be present at the openings. In some valve units being produced on a production line, there may be no flash or film, but in other valve units on the same production line, there may be a flash or film at the openings or recesses for openings. Thus, the piercing step automatically inspects the valves and at the same time removes any flash or film from the openings. Therefore, it is not necessary to inspect the valve units visually, remove them from the production line and separately carry out a piercing step.

FIG. 11 shows a molding apparatus and molding step very similar to that shown in FIG. 5, so the same reference numerals are used for like parts. A prime designation has been added to the reference numerals where appropriate. The upper platen 90' and lower platen 92' have bores 94' and 96' in which the pins 98' and 100' are received. As in the case of FIG. 5, the bores 94' and 96' are enlarged at 102' and 104' to form tubular cavity portions for molding of the upper valve stem portion 44' and lower valve stem portion 45'. Again there is a groove at 106' for molding the baffle of the valve unit. The inner ends of the pins 98' and 100' are fluted at 108' and 110' for molding of the holes 74 and 68 as previously described. The split ring halves 116' and 118' have surfaces 120', 122', 124' and 126' which contact the flutes on the pins to mold the holes through. The lower platen 92' has a ring shape projection 130' with a surrounding recess 132', and the ring halves 116' and 118' have recesses 134' and 136' for molding the flange or diaphragm 46'. The difference between FIG. 11 and FIG. 5 lies in the molding of the flange or diaphragm 46'. It may be seen in FIG. 11 that the flange 46' is molded in a downwardly and outwardly extending configuration so that as molded it clears the openings in the valve stem. Thus, when the valve unit has been molded in the mold of FIG. 11 and later removed from the mold, it has the normal appearance shown in FIG. 12 wherein the flange 46' extends downward and away from the openings 68' and 74' in the valve stem.

Figure 12:
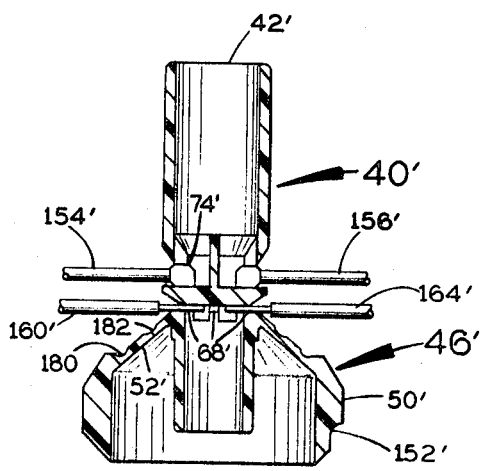
FIG. 12 is a vertical sectional view of a valve unit molded by the apparatus of FIG. 11 illustrating a step of piercing a valve stem of the unit at openings or recesses for openings therein for inspection.

Again, a step of piercing the valve stem at the openings is carried out by the use of piercing tools or other piercing means as shown in FIG. 12. There is an upper set of piercing tools, two of which 154' and 156' are visible in FIG. 12, and there is also a lower set of piercing tools two of which 160' and 164' are visible in FIG. 12. These tools move inwardly to pierce the openings for inspection purposes and to automatically remove any mold flash or film which may be covering or partially covering the openings.

Figure 14:
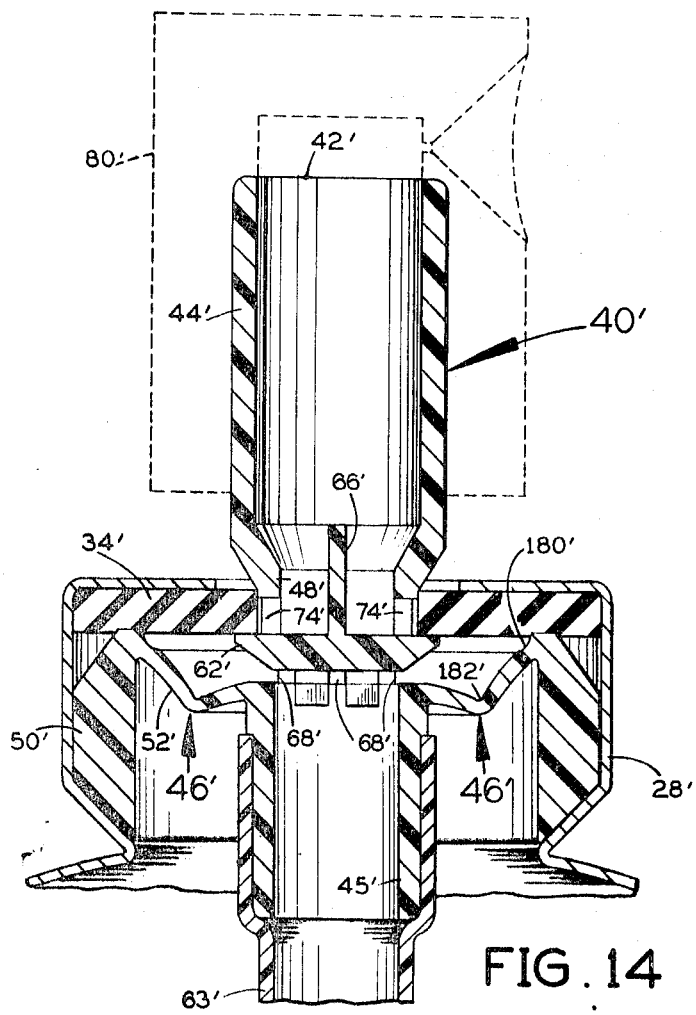
FIG. 14 is a vertical section view of a valve very similar to the valve of FIG. 1, but utilizing a valve unit of the type shown in FIGS. 11 through 13.
Figure 13:
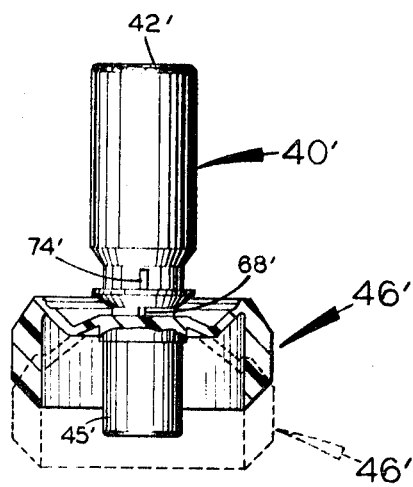
FIG. 13 illustrates the valve unit of FIG. 12 after inspection and shows a step of relatively distorting the valve stem and flange of the unit.

When the valve unit is molded in the configuration shown in FIGS. 11 and 12, the distorting step is carried out as illustrated in FIGS. 13 and 14 when the valve unit is assembled into a complete valve as shown in FIG. 14. Referring to FIG. 13, it may be seen that the flange 46' is distorted upwardly relative to the valve stem 42' to bring the flange 46' into the configuration shown in solid lines in FIG. 13. Thus, ultimately the valve unit has the same configuration as that shown in FIG. 1, as is apparent by inspection of FIG. 14 wherein the valve unit has almost the same appearance as that in FIG. 1.

Since the valve unit is distorted for assembly purposes, it is desirable to mold two recesses 180' and 182' in the flange 46' to facilitate bending of the membrane portion 52' of the flange 46'. These recesses 180' and 182' are most clearly visible in FIG. 12.

The dip tube 63' may be longer than the container and so bend when the valve is assembled to supply some of the biasing force to urge the stem seal 62' against the washer 34'.

A benefit of the configuration of the valve unit of FIG. 12 is that the membrane portion 52' of the flange 46' can be molded to almost any desired length or angle and then folded up in the manner shown in FIG. 13 to achieve the final configuration shown in FIG. 14. By this means, it is possible to select a desired travel which the valve stem can undergo when it is depressed for dispensing the pressurized contents of a container.

It is apparent from the foregoing description that the invention provides a novel method and apparatus for making valve units on a high volume production basis with relatively high yield of satisfactory units. High yields are encouraged by the piercing step which automatically both inspects the valve unit openings and removes any flash or film from these openings which could interfere with proper operation of the final valve. The molding apparatus and step are especially designed to produce mold-through openings in a valve stem and still allow easy opening of the mold apparatus. The valve unit can either be molded to its final configuration and distorted for inspection purposes or molded to an intermediate configuration and distorted for final assembly purposes.

Having thus described our invention, we claim:

1. A combination mold and piercing means comprising a pair of platens in spaced parallel relation, split ring means between said platens, portions of said ring means being separable laterally, a pair of axially aligned bores in said platens aligned with the interior of said ring means, and a pair of pins respectively in said bores having fluted ends projecting into said ring means to define a cavity having a tubular portion about said pins in said platens and said ring means with a radial extension between said ring means and one of said platens for molding a tubular stem with a radial flange, said fluted ends of said pins contacting or nearly contacting said ring means for molding openings or recesses in said stem adjacent said flange, and piercing means to penetrate film or flash at said openings where present.

2. A combination mold and piercing means apparatus comprising a pair of pins in axial alignment having fluted ends adjacent each other, axially split ring means around said pins contacting or nearly contacting said fluted ends, portions of said ring means being separable laterally, and first and second platens on opposite sides respectively of said split ring means and having bores therein receiving said pins, said pins being spaced from the bore surfaces and said split ring means being separated in part from said first platen to define a cavity having a tubular portion for molding of a stem and a radial extension for molding a radial flange on said stem and simultaneously molding openings or recesses for openings in said stem adjacent said flange where said fluted ends face said ring means, and piercing means to penetrate film or flash at said openings where present.

3. A method of making valve units comprising the steps of:
 (a) assembling axial pins with adjacent fluted ends in bores in platens and with split hole forming members contacting or nearly contacting the fluted ends of the pins between the platens to form a mold with a cavity for molding a hollow tubular stem having a radially projecting flange with openings or recesses in the stem where the hole forming members face the fluted pin ends,
 (b) injection molding plastic in said cavity to form said stem,
 (c) mold-forming openings or recesses in said stem where said hole forming members face said fluted pin ends,
 (d) removing said stem from said mold, and
 (e) piercing said stem at said openings for inspection and to penetrate flash or film at said openings where present.

4. A method of making valve units comprising the steps of:
 (a) assembling axially split ring members between platens having a bore with pin means in said bore having flutes contacting or nearly contacting said ring members to form a mold having a cavity for molding a valve unit having a stem with a radial flange and openings defined by said flutes in said stem at one side of said flange,
 (b) injection molding plastic in said cavity to mold said valve unit,
 (c) mold-forming openings or recesses in said stem where said flutes face said ring members,
 (d) removing said valve unit from said mold, and
 (e) piercing said stem at said openings with pins for inspection and to penetrate flash or film at said openings where present.

5. The method as claimed in claim 3 in which said flange is molded in said molding step to extend toward said openings, and said valve stem and said flange are relatively shifted after said molding and removal steps and prior to said piercing step to bend a portion of said flange away from said openings to provide clearance for the piercing.

6. The method as claimed in claim 3 in which said flange is molded in said molding step to extend away from said openings, and after said piercing step said valve stem and said flange are relatively shifted to bend a portion of said flange toward said openings.

References Cited
UNITED STATES PATENTS

| 3,488,810 | 1/1970 | Gellert | 18—42 D |
| 3,098,779 | 7/1963 | Cox | 264—154 |

ROBERT F. WHITE, Primary Examiner

R. SHEAR, Assistant Examiner

U.S. Cl. X.R.

18—42 D; 222—402.22; 264—328